(12) United States Patent
Correale

(10) Patent No.: US 7,030,620 B2
(45) Date of Patent: *Apr. 18, 2006

(54) IONIZATION VACUUM GAUGE

(75) Inventor: Raffaele Correale, Turin (IT)

(73) Assignee: Varian S.p.A., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/910,093

(22) Filed: Aug. 3, 2004

(65) Prior Publication Data

US 2005/0030044 A1 Feb. 10, 2005

(30) Foreign Application Priority Data

Aug. 8, 2003 (IT) .......................... To2003A0626

(51) Int. Cl.
*G01R 21/30* (2006.01)

(52) U.S. Cl. ...................... 324/460; 324/464

(58) Field of Classification Search .............. 324/459, 324/460, 464
See application file for complete search history.

(56) References Cited

U.S. PATENT DOCUMENTS

| | | | | |
|---|---|---|---|---|
| 2,605,431 A | 7/1952 | Bayard | ........................ | 327/600 |
| 5,278,510 A | 1/1994 | Baptist et al. | .............. | 324/460 |
| 5,767,629 A | 6/1998 | Baptist | ........................ | 315/168 |
| 5,973,444 A | 10/1999 | Xu et al. | ..................... | 313/309 |
| 6,474,171 B1 * | 11/2002 | Holme et al. | .................. | 73/753 |
| 6,633,041 B1 * | 10/2003 | Felter | ..................... | 250/423 R |
| 2001/0011890 A1 | 8/2001 | Kawasaki | .................... | 324/460 |
| 2003/0057953 A1 | 3/2003 | Rutherford et al. | ......... | 324/460 |

FOREIGN PATENT DOCUMENTS

| | | |
|---|---|---|
| DE | 4 137 527 A1 | 5/1993 |
| EP | 0 662 607 A1 | 7/1995 |
| JP | 3 293 533 A1 | 12/1991 |
| JP | 07 099034 A | 4/1995 |
| JP | 10 267780 A | 10/1998 |

* cited by examiner

*Primary Examiner*—Walter Benson
(74) *Attorney, Agent, or Firm*—Bella Fishman

(57) ABSTRACT

The present invention relates to an ionisation vacuum gauge for measuring the residual pressure of a gaseous material remaining in a container (10), more particularly after operation of a vacuum pump. The gauge comprises an electron-emitting cathode (17), a grid (13) for accelerating the electrons emitted by the cathode and a plate (15) collecting the ions and/or the ionised positive molecules of the gas, wherein said plate is placed outside said grid. Measuring the plate current by a galvanometer allows determining the value of the residual pressure inside the container.

26 Claims, 6 Drawing Sheets

IONIZATION VACUUM GAUGE

FIELD OF THE INVENTION

The present invention relates to an ionisation vacuum gauge.

More particularly, the present invention relates to an ionisation vacuum gauge for measuring the residual pressure of a gaseous material remaining in a container, for instance, after operation of a vacuum pump, the gauge being of the kind comprising an electron-emitting cathode, a grid for accelerating the electrons emitted by the cathode and a plate collecting the ions or the ionised positive molecules of the gas, wherein the measurement of the plate current by a galvanometer allows determining the value of the residual pressure inside the container.

BACKGROUND OF THE INVENTION

Two kinds of vacuum gauges are known: thermionic emission vacuum gauges (also called hot cathode vacuum gauges), and field emission (or cold cathode) vacuum gauges.

In thermionic emission vacuum gauges, the electron source consists in one or more filaments, for instance of tungsten, brought to incandescence. A typical example of hot cathode vacuum gauge is the Bayard-Alpert vacuum gauge. That kind of vacuum gauge comprises a wire-shaped ion collecting plate, a cylindrical grid surrounding said plate and an incandescent tungsten filament for electron emission, located outside the grid. The electrons emitted by the filament and accelerated by the grid ionise the residual gas, and the ions and/or the ionised positive molecules are collected by the plate, which is kept at lower potential than the electron source and the grid.

In the disclosed design, the electrons pass several times through the grid and, during such in and out movement, they ionise the residual gas until they hit the grid and are absorbed by it.

Due to that design including a plate reduced to a simple wire, pressures as low as about $10^{-9}$ Pa could be measured. Because of the reduced plate wire surface, the background current is minimised due to photoelectric effect from the plate (electron emission) caused by X rays produced by electrons hitting the grid.

Such a vacuum gauge is disclosed for instance in U.S. Pat. No. 2,605,431, "Ionisation Vacuum Gauge".

The major drawback of that kind of vacuum gauges is related to the nature of the electron-emitting cathode. Actually, a heated filament is an isotropic electron source, whereas directionality of the electron beam is an essential parameter for vacuum gauge sensitivity.

In the disclosed design, vacuum gauge sensitivity is not constant, since the distribution of the electron emission direction changes as the temperature along the emitting cathode filament changes, said filament typically reaching temperatures up to about 2000° C.

Moreover, the phenomenon of electron emission by thermionic effect entails high power consumption, long response times and a non-negligible pollution of the surrounding environment due to the release of impurities.

In order to improve the performance of Bayard-Alpert vacuum gauges, use of more recent technologies has been proposed for making the electron-emitting cathode.

U.S. Pat. No. 5,278,510 "Ionisation Vacuum Gauge Using a Cold Micropoint Cathode" discloses a vacuum gauge wherein, in order to obviate the drawbacks mentioned above, the heated filament is replaced by a microtip cold cathode.

A microtip cathode comprises a set of very small tip-shaped emitters, located beneath an extraction grid provided with corresponding openings. The microtips are made of metal (molybdenum, niobium) or of silicon-polysilicon and are placed on supports of the same material, or of silicon or glass. By applying a potential difference between the microtips and the extraction grid, an electric field is produced that is strong enough to produce electron emission. This microtip cathode is an extremely directional electron source, with low consumption and very short response time.

FIG. 1 schematically shows a microtip disclosed above. On a plane substrate 1, for instance of niobium or molybdenum, a tip 3 of the same metal, about 1 µm high, is grown. An extraction grid 5 is located above substrate 1 and parallel thereto, and has openings 7 in correspondence with each tip 3. Said openings 7 typically have diameters of about 1 µm. Said grid 5 is kept separated from said substrate 1 and from tips 3 by an insulating layer 9, having a cavity 11 in correspondence with each tip 3 to allow electron emission from tip 3 through the corresponding opening 7 in extraction grid 5.

Usually, the microtips are produced in arrays and adjacent microtips are spaced apart by few micrometers, so that densities of the order of $10^6$ to $10^8$ microtips/cm$^2$ can be achieved.

The teaching of U.S. Pat. No. 5,278,510 provides, however, only a partial response to the problems inherent in ionisation vacuum gauges.

More particularly, the vacuum gauge described above, which reproduces the geometry of a conventional Bayard-Alpert vacuum gauge, is cumbersome and difficult to use in many applications. Moreover, said vacuum gauge is by itself a non-negligible distortion in pressure measurement, taking also into account the high vacuum degrees it is intended for.

This is mainly due to the fact that, even if the microtip cathode is a highly directional electron source, electron movement into and out of the cylindrical grid does not allow reducing the vacuum gauge size.

SUMMARY OF THE INVENTION

It is the main object of the present invention to overcome the above drawbacks, by providing a miniaturised vacuum gauge, which has a great sensitivity and which does not appreciably perturb the pressure measurements.

It is another object of the present invention to provide an ionisation vacuum gauge with a cold electron source having high directionality, low consumption and short response time.

The above and other objects are achieved by a vacuum gauge as claimed in the appended claims.

Advantageously, the arrangement according to the invention, in which the collecting plate is located outside the grid-shaped anode accelerating the electrons, allows a considerable size reduction.

Moreover, by using a substantially plane grid-shaped anode, an electron beam can be obtained that leaves said anode according to a predetermined direction, substantially perpendicular to the plane on which said anode lies.

The advancing direction of the electrons is then modified by the collisions with the atoms or molecules of the residual gas and by interaction with the plate. The electrons however continue moving in the space between the anode and the plate, without any appreciable electron amount passing again through the grid-shaped anode.

Advantageously, the vacuum gauge performance can be enhanced by acting on the characteristics of the electron motion, by introducing magnetic and/or electric fields.

Introducing a magnetic field allows for imparting to said electrons a spiral motion, thereby allowing incrementing the collisions with the residual gas atoms or molecules for a given linear distance travelled.

By introducing means capable of deflecting an ion beam, for instance a capacitor with shaped plates or a pair of permanent magnets, the ions or the ionised molecules can be taken from the region where they are produced and transferred to the collecting plate.

The emitting cathode is preferably manufactured by using the microtip technology. Thus, due to the plane grid anode and to a cold emitting cathode, the overall size of the vacuum gauge according to the invention can be limited to a few hundreds of micrometres.

Some preferred embodiments of the vacuum gauge according to the invention, given by way of non-limiting example, will be disclosed in greater detail hereinafter, with reference to the accompanying drawings, in which:

DETAILED DESCRIPTION OF THE PREFERRED EMBODIMENT

Figure 1:
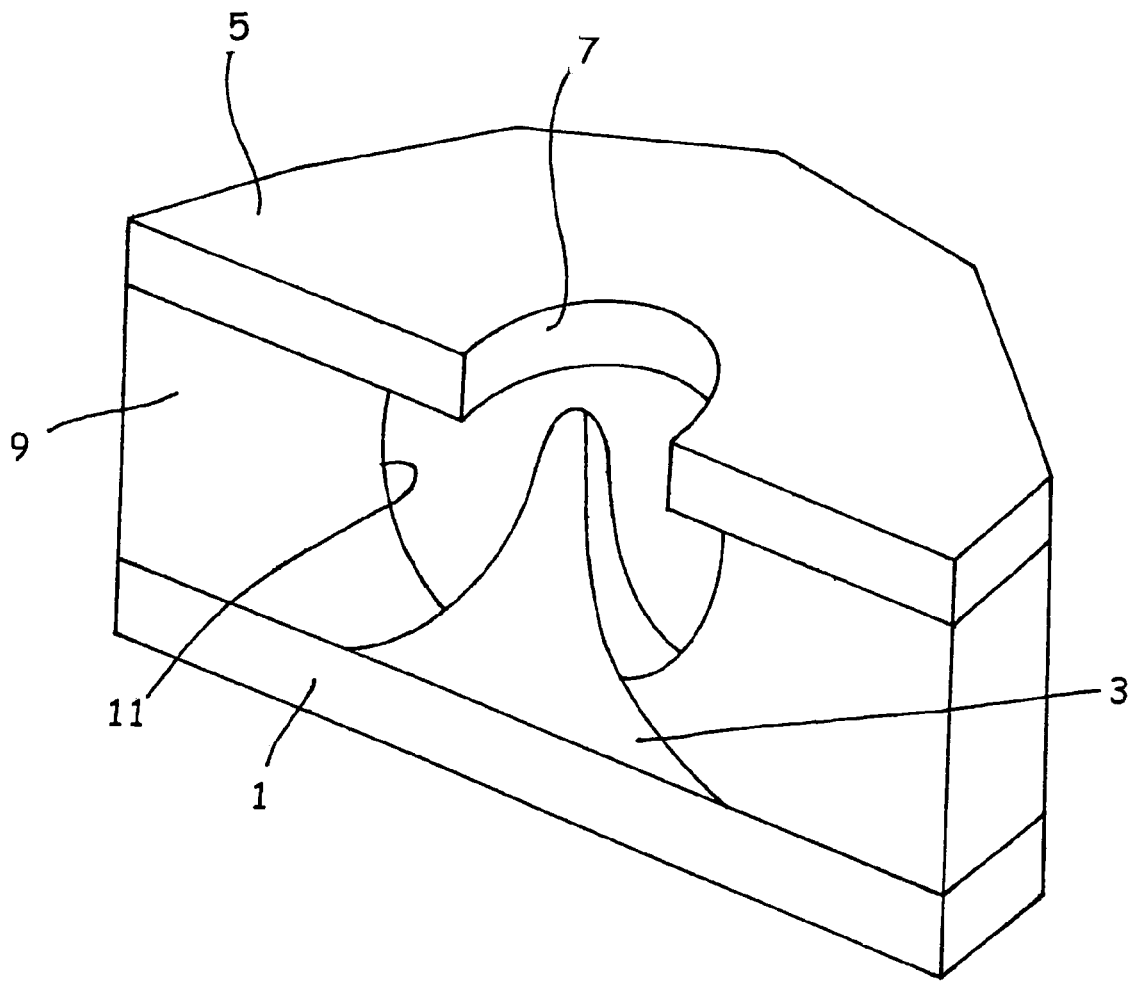
FIG. 1 is a schematic perspective representation of a microtip of an electron emitting cathode according to previously discussed prior art.
Figure 2:
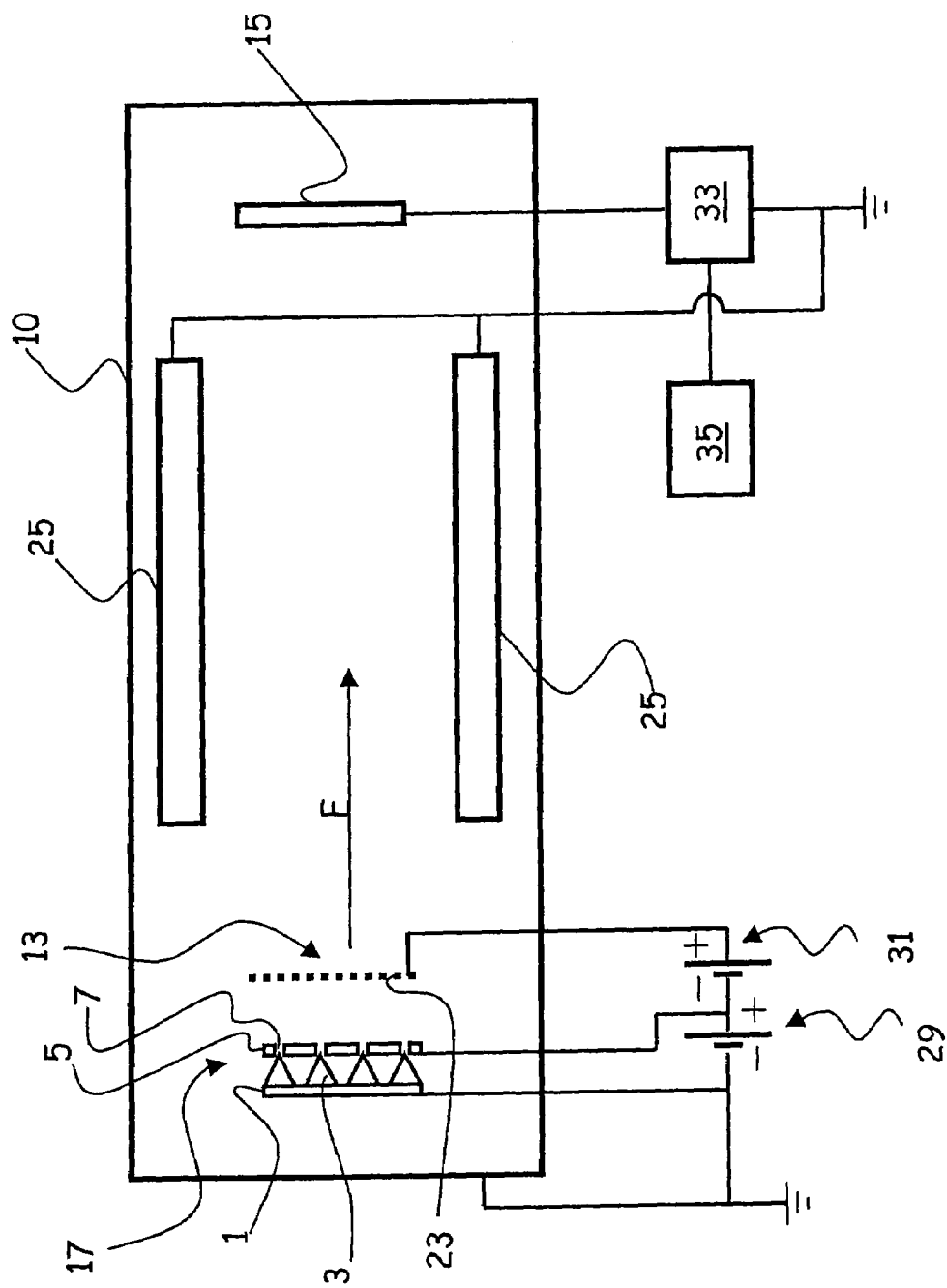
FIGS. 2 to 6 are schematic representations of the vacuum gauge according to different embodiments of the invention.

Referring to FIG. 2, there is shown a first embodiment of the vacuum gauge according to the invention. A chamber 10 encloses the volume containing a gaseous material, the residual pressure of which is to be measured. The vacuum gauge comprises a cathode 17 capable of emitting electrons, a grid-shaped anode 13, capable of accelerating the electrons emitted by cathode 17, and a plate or collecting electrode 15, which is intended to collect the gas ions produced by electron collisions with the atoms or molecules of said gaseous material.

Anode 13 is made as a substantially plane grid and is placed opposite cathode 17, at short distance therefrom. Thus, the electrons emitted by cathode 17 are accelerated into a beam oriented according to a preferential initial direction (denoted by arrow F), substantially perpendicular to the plane of anode 13. Plate 15 is made as a plane plate, in register with and substantially parallel to grid-shaped anode 13.

According to the first embodiment as shown in FIG. 2, cathode 17, grid 13 and plate 15 are made as plane plates. Such members could however have different shapes as well, e.g. a concave or convex shape. Moreover, plate 15 could also be made as a small bar or a wire. The plane plate shape is however preferable since increasing the plate surface directed towards the electron source results in increasing the sensitivity of said plate. According to the embodiment shown, cathode 17 is made by using the microtip technology. As discussed above, a microtip cathode comprises a set of very small tips 3, placed onto a conducting substrate 1 beneath an extraction grid 5 having corresponding openings 7. By applying a suitable potential difference between grid 5 and microtips 3, an electric field is produced that is strong enough to cause electron emission.

The electrons, once emitted, are accelerated through holes 23 of grid-shaped anode 13 in a direction perpendicular to anode, towards plate 15. To this end, grid-shaped anode 13 is biased at a potential $V_{13}$ higher than potential $V_5$ at which extraction grid 5 is set, and such that the electrons passing through the anode come out therefrom with a kinetic energy preferably in the range 100 to 150 eV, being a favourable energy range for ionisation of residual gas present in chamber 10.

In order to keep substrate 1, extraction grid 5 and anode 13 at different potentials, the vacuum gauge according to the invention includes two D.C. power supplies 29, 31 connected in series. The first power supply 29 keeps extraction grid 5 at a potential $V_5$ higher than the potential of tips 3, which are grounded, so as to create the electric field required for electron emission. The second power supply 31 keeps grid-shaped anode 13 at a potential $V_{13}$ higher than potential $V_5$ of extraction grid 5, so as to accelerate the electrons, preferably to an energy in a range 100 to 150 eV.

Along their paths between grid-shaped anode 13 and plate 15, the electrons collide with the atoms or the molecules of the residual gas, ionising them. When arriving close to plate 15, the electrons are repelled by the plate, since said plate is grounded. The electrons are also repelled by the walls of chamber 10, which also are grounded, and are directed again towards grid-shaped anode 13, by which the electrons are eventually absorbed after further collisions with atoms or molecules of the residual gas.

The ions of the residual gas are on the contrary collected by plate 15, which is connected with a galvanometer 33 allowing measuring the plate ion current. Suitable means 35 for processing the analogue signal generated by galvanometer allows for the residual gas pressure in chamber 10 from the value of the ion current, once the current intensity of the electron source consisting in cathode 17 is known.

To obtain a more accurate measurement, also grid 13 can be connected to a second galvanometer, for measuring the grid electron current due to the absorbed electrons.

Residual pressure $p_x$ can thus be obtained according to relation:

$$p_x = c \cdot i_p / i_g,$$

where c is a constant typical of the apparatus and of the gas nature;

$i_p$ is the plate current intensity;

$i_g$ is the grid current intensity.

Note that using a plane geometry allows for placing the collecting plate at a greater distance from the grid (which, on the contrary, surrounds the plate in the Bayard-Alpert vacuum gauge), thus limiting the background current due to the photoelectric effect of the plate, caused by X rays produced on the grid. Consequently, in the vacuum gauge according to the invention, the plate does not need to be reduced to a wire (as in the Bayard-Alpert vacuum gauge), but its surface can be advantageously increased so as to enhance the measurement sensitivity.

Moreover, using a plane geometry for grid-shaped anode 13, together with using a microtip emitting cathode, allows for obtaining a vacuum gauge with greatly reduced size. Cathode 17 and grid-shaped anode 13 may be spaced apart by some tens of micrometres (for instance, 20 to 50 μm), and the spacing between grid-shaped anode 13 and plate 15 may for instance in a range from 100 to 500 μm, depending on the desired sensitivity. Clearly indeed, the greater the spacing between grid-shaped anode 13 and plate 15, the greater the probability of ionisation of the residual gas contained in chamber 10.

In order to further reduce the vacuum gauge size, according to the embodiment shown in FIG. 2, two magnets 25 (for instance, electromagnets or permanent magnets), formed by grounded discs or plane plates, are located between grid-shaped anode 13 and plate 15, in planes perpendicular to grid-shaped anode 13 and plate 15 and hence parallel to the initial direction of the electron beam.

The magnetic field produced by magnets 25 affects the motion of the electrons, which follow spiral paths. Thus, the number of collisions of each electron with the atoms or the molecules of the residual gas per unit of linear distance travelled is increased. In other words, with a same geometry, the ionisation degree of said gas and hence the vacuum gauge sensitivity are increased. In the alternative, still due to the provision of the magnets described above, the spacing between grid-shaped anode 13 and plate 15 (and hence the overall dimensions of the vacuum gauge according to the invention) can be reduced while leaving the ionisation degree of the residual gas and the vacuum gauge sensitivity unchanged.

Figure 3:
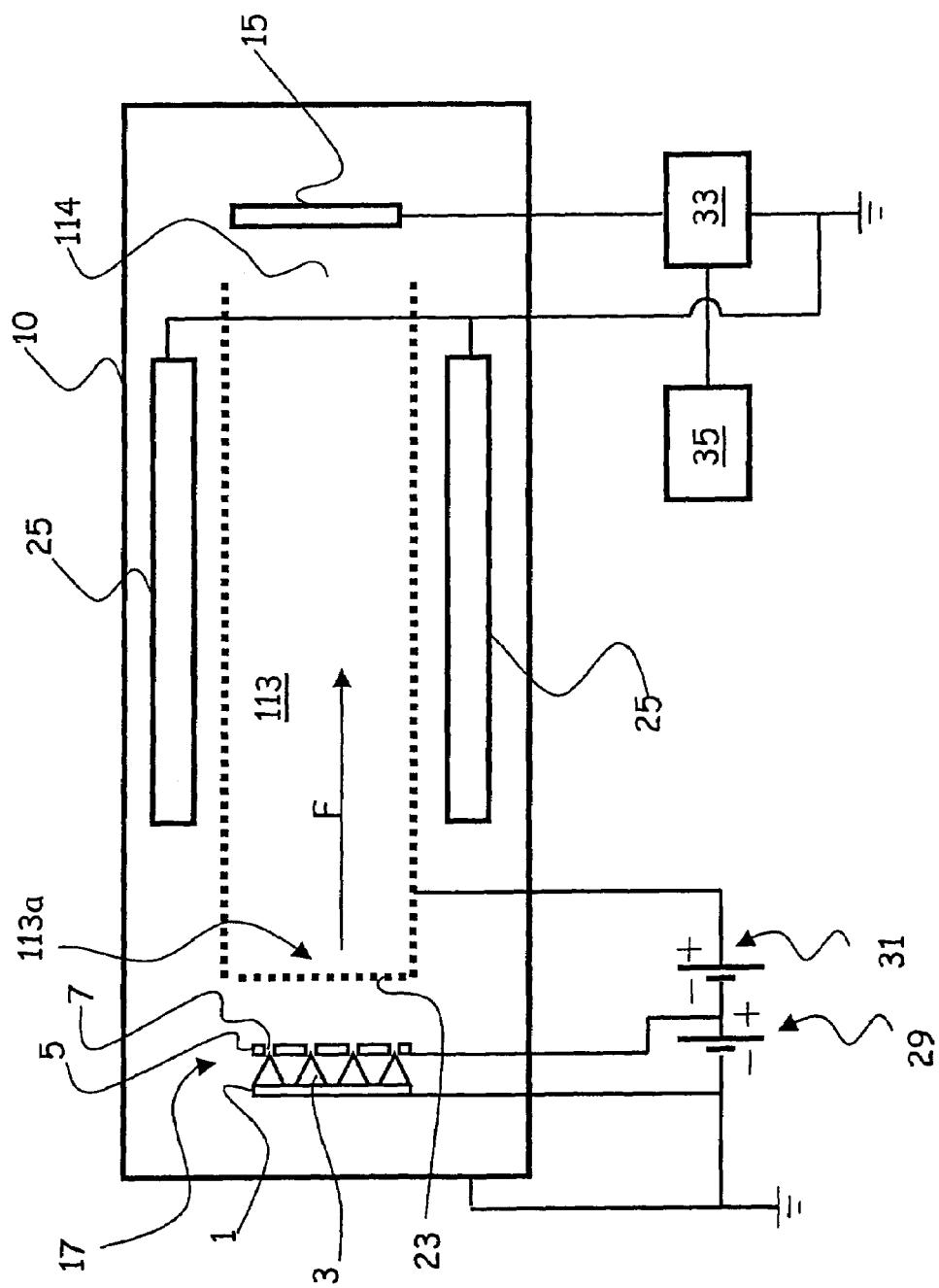

Turning to FIG. 3, there is shown a second embodiment which differs from the previous one in the shape of the grid-shaped anode, here denoted by reference numeral 113.

Anode 113 is a substantially parallelepiped cage, having a face 113a parallel to cathode 17 and placed at a short distance therefrom. Thus, the electrons emitted by cathode 17 are accelerated through face 113a of anode 113 according to a preferential initial direction (denoted by arrow F), substantially perpendicular to the plane of face 113a.

Collecting plate 15 is placed opposite face 113a, in correspondence of open base 114 of grid 113.

Note that using a parallelepiped grid 113 allows for increasing the vacuum gauge sensitivity. Actually, being both plate 15 and the walls of chamber 10 grounded, the ions could be attracted by the walls rather than by plate 15, thereby creating an ion dispersion effect. Using a parallelepiped grid 113, which is closed except for opening 114 in correspondence of plate 15, allows for avoiding ion dispersion and consequently increasing the vacuum gauge sensitivity.

Figure 4:
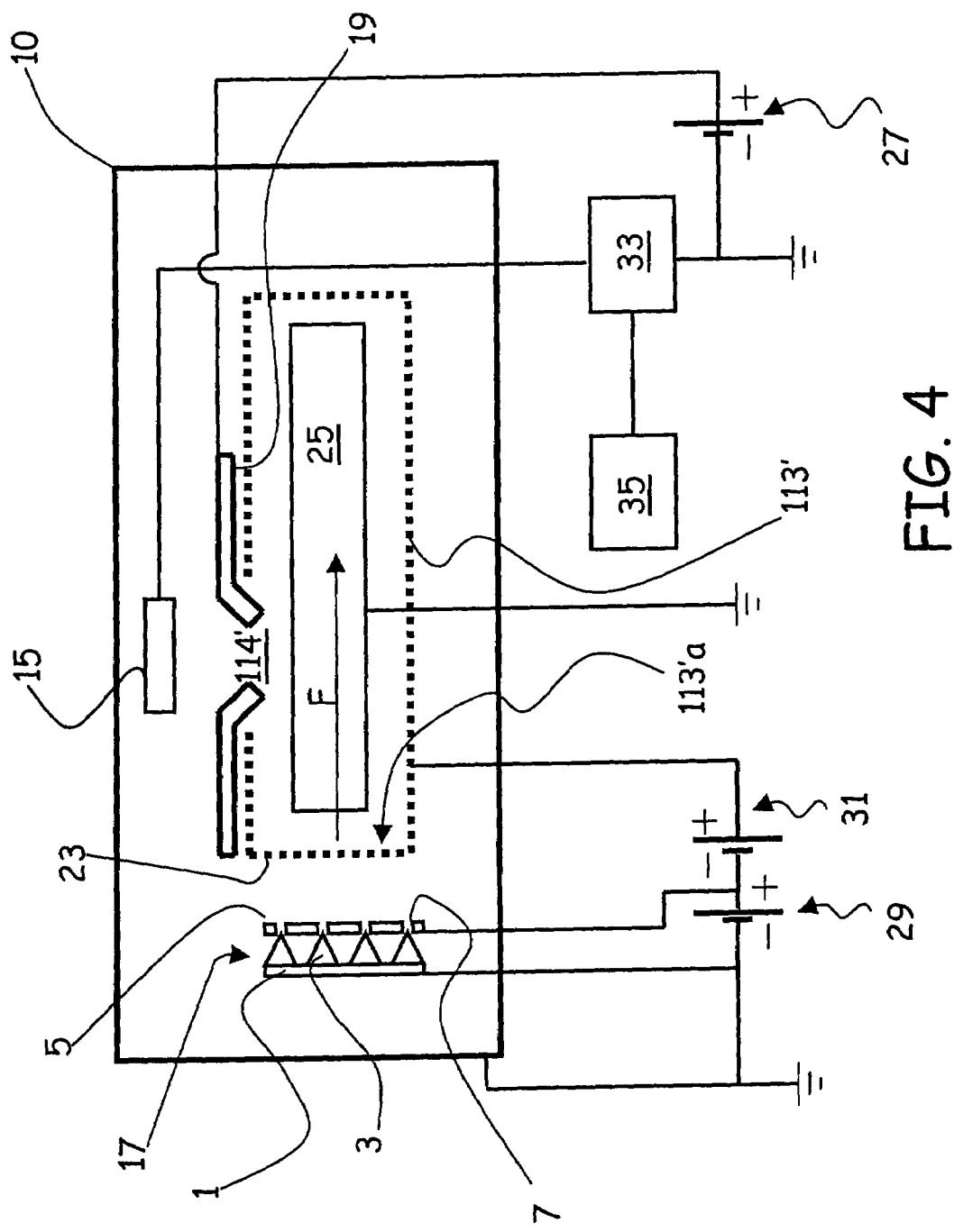

Turning now to FIG. 4, there is shown a third embodiment of the vacuum gauge according to the invention, which differs from the previous ones in the arrangement of collecting plate 15.

In the previously disclosed embodiments, plate 15 is placed opposite the cathode and lies in a plane substantially parallel to the cathode itself and perpendicular to preferential direction F of the electron beam.

In the embodiment shown in FIG. 4, plate 15 lies in a plane substantially perpendicular to the plane of cathode 17, and hence it is located in a plane parallel to preferential initial direction F of the electron beam. Thus, the ions and the ionised molecules attracted towards plate 15 move towards the plate in a direction substantially perpendicular to that of the electron beam.

Thus, interactions between the electron source (cathode 17) and collecting plate 15 are limited. More particularly, the photoelectric effect on plate 15 due to X rays emitted by grid 113' is significantly limited, whereby the sensitivity of the vacuum gauge according to the invention is further increased.

In this embodiment, grid-shaped anode 113' is equipped with a side opening 114' in correspondence with collecting plate 15.

An extracting device 19 may be provided in correspondence of opening 114' to make ion channelling towards plate 15 easier. The extracting device may, for example comprise electrostatic lens and it is connected to a power supply 27, such that the extraction device can be brought to a potential intermediate between the potentials of plate 15 (that is grounded) and grid 113'.

In this embodiment, a pair of magnets 25 may be provided in order to create a magnetic field causing the electrons to move along spiral paths. In the present case, magnets 25 are advantageously located in planes perpendicular to both cathode 17 and plate 15.

In order to limit the background current due to photoelectric effect of the plate caused by X rays produced on the grid and, hence, to improve the sensitivity of the vacuum gauge according to the invention, it might be advantageous to place collecting plate 15 at a greater distance from grid-shaped anode 113'. To this aim, means such as magnets, capacitor plates, electrostatic lenses, radio frequency devices, capable of deflecting a beam of charged particles, could be used.

Figure 5:
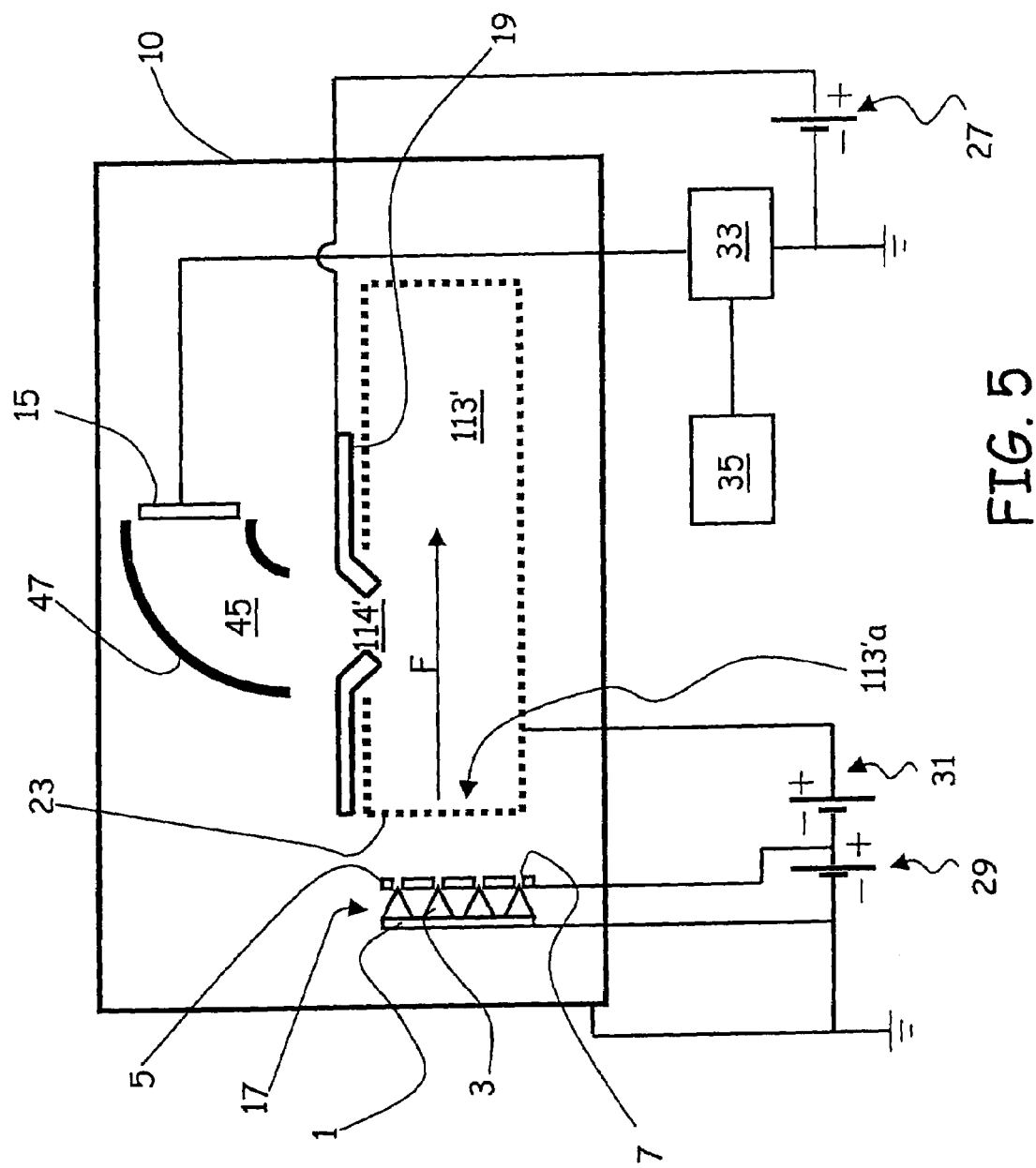

Turning to FIG. 5, there is shown a fourth embodiment of the invention, in which a capacitor 45 is provided, of which plates 47 are suitably biased and shaped so as to channel between them the ions or the ionised molecules, thereby deflecting their advancing direction by about 90°.

More particularly, one of plates 47 may be grounded and the other may be brought to a suitable potential to obtain ion paths with the desired curvature radius.

The electrons accelerated by anode 113' collide with the atoms or the molecules of the residual gas and ionise them. The ions or the ionised molecules are channelled by extracting device 19 into the space between plates 47 of capacitor 45 and are deflected by 90° towards plate 15 placed at the exit from the passageway defined between said plates 47.

Figure 6:
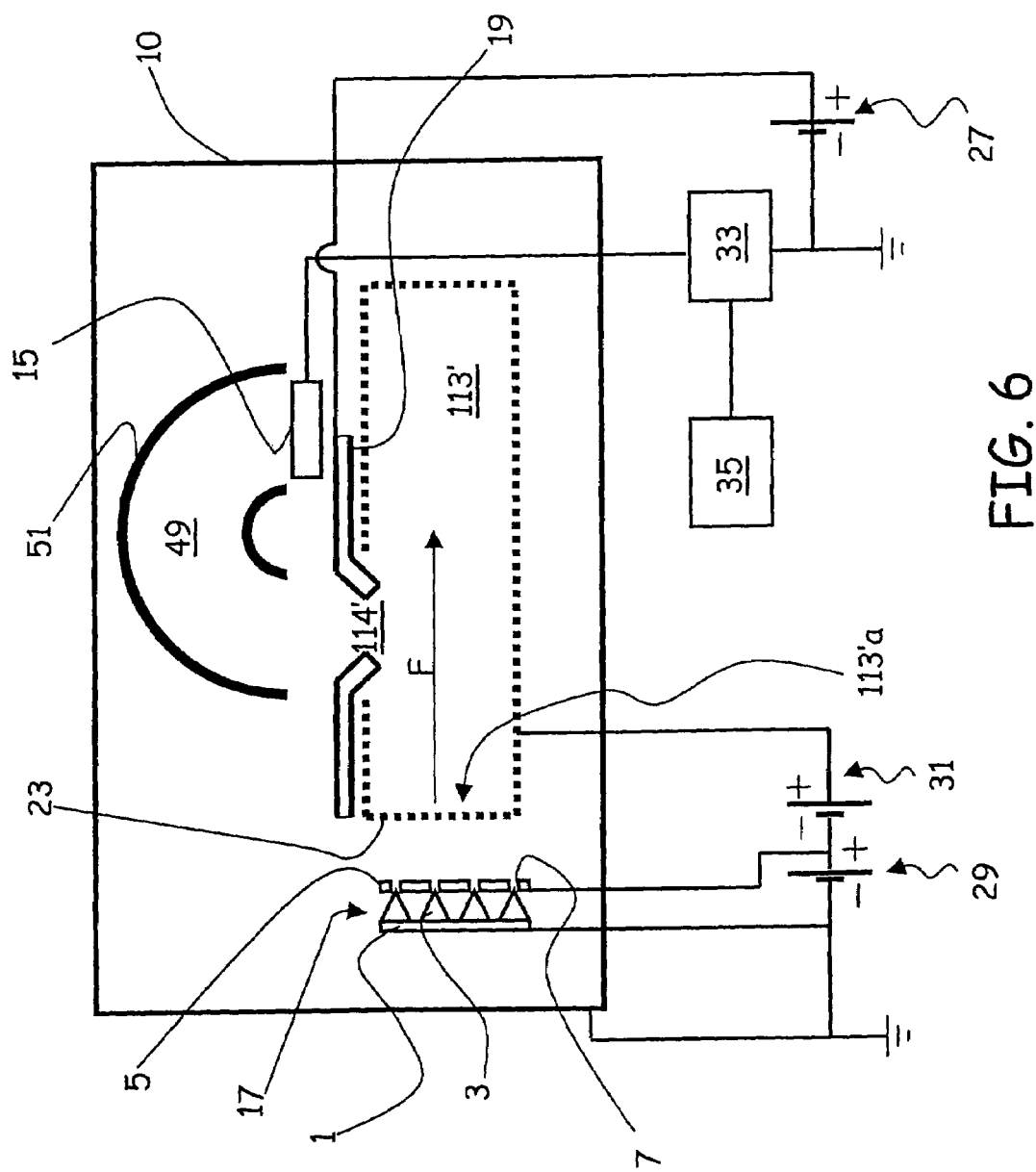

Similarly, in a fifth embodiment of the vacuum gauge according to the invention, shown in FIG. 6, a capacitor 49 may be provided, located between extracting device 19 and collecting plate 15 and having plates 51 that are suitably biased and shaped so as to deflect the direction of the ions or the ionised molecules by about 180°.

The ions or the ionised molecules produced by the collisions of the electrons accelerated by anode 113' are channelled between plates 51 of capacitor 49 and are deflected by 180° towards plate 15 placed at the exit from the passageway defined between plates 51.

Advantageously, according to the latter two embodiments, collecting plate 15 is isolated from the electron beam and the electron source, so that the photoelectric effect due to X rays produced on grid 113' is significantly reduced.

The fourth and fifth embodiments described above may utilise a pair of shaped magnets in place of a capacitor for deflecting the ions. In such case, electrical potential $V_m$ between said magnets will be chosen depending on the curvature radius desired for the ion paths, according to relation:

$$m/q = r^2 B^2 / 2(V_{113'} - V_m),$$

where m and q are the mass and the charge, respectively, of the ions to be deflected;

r is the desired curvature radius;

B is the strength of the magnetic field generated by said magnets and;

$V_{113'}$ is the potential of grid 113'.

The skilled in the art will immediately appreciate that the use of the vacuum gauge described above gives important advantages. First, the possibility of constructing a vacuum gauge of extremely reduced size makes the vacuum gauge according to the invention suitable for any field of application. Still due to its reduced size, the vacuum gauge according to the invention does not perturb the environment where pressure is to be measured, so that said measurement is more reliable and accurate. Moreover, while operating according to principles similar to a Bayard-Alpert vacuum gauge, the vacuum gauge according to the invention has a wider operating pressure range, whereby it can be used with advantage for measuring very high vacuum of the order of $10^{-10}$ to $10^{-11}$ Pa.

It is clear as well that the above description has been given only by way of non limiting example and that changes and modifications are possible without departing from the scope of the present invention as claimed.

In particular, even though using a cold cathode with microtips for electron emission is advantageous, any electron source (including the conventional incandescent wire) could be used, without thereby departing from the scope of the present invention.

What is claimed is:

1. An ionisation vacuum gauge for measuring a residual pressure of a gaseous material in a container (10) comprising:
   an electron-emitting cathode (17),
   a grid (13; 113; 113') for accelerating electrons emitted by said cathode, wherein said accelerating grid (113; 113') has a substantially parallelepiped shape and comprises a face (113a) substantially parallel with and opposite to said cathode (17), whereby said accelerating electrons emitted by said cathode are directed along a direction F substantially normal to said face (113a),
   a plate (15) collecting ions and/or ionised positive molecules of the gaseous material, said plate (15) being placed outside said grid (13; 113; 113'), and
   a galvanometer (33) for measuring a plate current, and deriving therefrom a value of the residual pressure inside the container.

2. The vacuum gauge of claim 1, wherein said accelerating grid has an opening (114) for extracting ions and/or ionised molecules towards said plate (15).

3. The vacuum gauge of claim 1, wherein said accelerating grid (13; 113; 113') is traversed by the electrons emitted by said cathode in a substantially said direction F.

4. The vacuum gauge of claim 3, wherein said plate (15) is placed in a plane substantially parallel to said direction F.

5. The vacuum gauge of claim 4, wherein a distance between said cathode (17) and said face (113a) of said accelerating grid (13; 113; 113') is substantially smaller than a distance between said cathode (17) and said plate (15).

6. The vacuum gauge of claim 5, wherein the distance between said cathode (17) and said face (113a) of said accelerating grid (13; 113; 113') is preferably in a range between 20 and 50 μm, and the distance between said cathode (17) and said plate (15) is preferably smaller then 550 μm.

7. The vacuum gauge of claim 1, wherein said accelerating grid (13; 113; 113') is traversed by a majority of the electrons emitted by said cathode (17) only once.

8. The vacuum gauge of claim 1, further comprising means for generating an electric and/or magnetic field for increasing a path travelled by the electrons between said accelerating grid (13; 113; 113') and said plate (15).

9. The vacuum gauge of claim 8, wherein said generating means comprises a pair of permanent magnets or electromagnets (25) forming a passageway therebetween for electrons accelerated by said accelerating grid (13; 113; 113') and directed towards said plate (15).

10. The vacuum gauge of claim 1, further comprising extracting means (19) for channelling ions and/or molecules towards said plate (15).

11. The vacuum gauge of claim 10, wherein said generating means (19) comprises an electrostatic lens connected to a power supply (27) keeping the lens at a potential different from zero and lower than the potential of said accelerating grid (13; 113; 113').

12. The vacuum gauge of claim 1, further comprising means for generating an electric and/or magnetic field deflecting ions and/or ionised molecules in a predetermined direction away from said direction F.

13. The vacuum gauge of claim 12, wherein said generating means comprises a pair of curved plates (47; 51) forming therebetween a passageway for ions and/or ionised molecules directed towards said plate (15).

14. The vacuum gauge of claim 13, wherein said ions and/or ionised molecules travelling through said passageway are deflecting therein between 0° and 180°.

15. The vacuum gauge of claim 14, wherein said ions and/or ionised molecules travelling through said passageway are deflecting to about 90°, and wherein said plate (15) is substantially parallel to said cathode (17).

16. The vacuum gauge of claim 14, wherein said ions and/or ionised molecules travelling through said passageway are deflecting to about 180°, and wherein said plate (15) is substantially perpendicular to said cathode (17).

17. The vacuum gauge of claim 13, wherein said generating means comprises:
    a pair of plates (47; 51), a capacitor (45; 49), a first plate of said pair being grounded and a second plate being suitably biased.

18. The vacuum gauge of claim 13, wherein said generating means comprises a pair of permanent magnets or electromagnets.

19. The vacuum gauge of claim 1, wherein said cathode (17) comprises a set of microtips (3).

20. The vacuum gauge of claim 19, wherein said microtips (3) are arranged on a substrate (1) beneath an extraction grid (5) having corresponding openings (7), said microtips being directed towards said extraction grid (5) and said accelerating grid (13; 113; 113').

21. The vacuum gauge of claim 20, wherein said extraction grid (5) is connected to a first power supply (29) by which it is kept at a potential higher than that of said microtips (3), and said accelerating grid (13; 113; 113') is connected to a second power supply (31) by which it is kept at a potential higher than that of said extraction grid (5).

22. The vacuum gauge of claim 21, wherein said microtips (3) are grounded.

23. The vacuum gauge of claim 22, wherein said plate (15) is grounded.

24. The vacuum gauge of claim 23, wherein walls of said container (10) are grounded.

25. The vacuum gauge of claim 1, wherein said plate (15) is connected with said galvanometer (33) for measuring the plate current.

26. The vacuum gauge of claim 25, further comprising a processing means (35) for processing a signal generated by said galvanometer (33), said processing means producing a signal representative of the gas pressure inside said container (10).

* * * * *